(12) United States Patent
Kiefer et al.

(10) Patent No.: US 6,588,234 B1
(45) Date of Patent: Jul. 8, 2003

(54) DEVICE AND METHOD OF PLAINING GLASSES OR GLASS-CERAMICS

(75) Inventors: Werner Kiefer, Mainz (DE); Uwe Kolberg, Mainz-Kastel (DE); Hildegard Römer, Karben (DE); Stefan Schmitt, Stadecken-Elsheim (DE); Wolfgang Schmidbauer, Mainz (DE)

(73) Assignee: Schott Glass, Mainz (DE)

( * ) Notice: Subject to any disclaimer, the term of this patent is extended or adjusted under 35 U.S.C. 154(b) by 205 days.

(21) Appl. No.: 09/641,993

(22) Filed: Aug. 18, 2000

(30) Foreign Application Priority Data

Aug. 21, 1999 (DE) .......................... 199 39 773

(51) Int. Cl.⁷ ............................. C03B 5/225
(52) U.S. Cl. .................. 65/134.3; 65/134.4; 65/134.5; 65/135.6; 65/346; 65/355
(58) Field of Search ............. 65/134.3, 134.4, 65/134.5, 135.1, 135.6, 346, 347, 355

(56) References Cited

U.S. PATENT DOCUMENTS

| | | | | |
|---|---|---|---|---|
| 2,465,283 A | * | 3/1949 | Schlehr | 65/490 |
| 2,877,280 A | * | 3/1959 | Eden | 65/134.2 |
| 3,244,495 A | | 4/1966 | Apple et al. | |
| 3,445,215 A | * | 5/1969 | De Bock | 65/134.9 |
| 3,951,635 A | | 4/1976 | Rough, Sr. | |
| 3,997,313 A | * | 12/1976 | Alexander | 501/37 |
| 4,004,902 A | * | 1/1977 | Pieper | 65/134.2 |
| 4,195,982 A | | 4/1980 | Coucoulas et al. | |
| 4,471,488 A | * | 9/1984 | Reboux | 373/153 |
| 4,504,302 A | * | 3/1985 | Carman | 65/134.2 |
| 4,726,831 A | * | 2/1988 | Fogle et al. | 65/128 |
| 4,780,121 A | | 10/1988 | Matesa | |
| 5,367,532 A | * | 11/1994 | Boen et al. | 373/142 |
| 5,564,102 A | * | 10/1996 | Igarashi et al. | 373/146 |
| 5,922,097 A | * | 7/1999 | Kobayashi et al. | 65/134.1 |
| 6,318,126 B1 | * | 11/2001 | Takei et al. | 65/134.2 |

FOREIGN PATENT DOCUMENTS

| | | | | |
|---|---|---|---|---|
| DE | 234 853 A1 | 4/1986 | | C03B/7/08 |
| EP | 0 079 266 | 5/1983 | | C04B/35/60 |
| JP | 57-95834 | 6/1982 | | C03B/5/02 |

OTHER PUBLICATIONS

Petrov, Yu.B. et al.: "Continuous Casting Glass Melting in a Cold Crucible Induction Furnace" XV International Congress on Glass 1989, Proceedings, vol. 3a, 1989, pp. 73–77 (no month available).

\* cited by examiner

*Primary Examiner*—Sean Vincent
(74) *Attorney, Agent, or Firm*—Randall J. Knuth

(57) ABSTRACT

A device and method for the plaining of glasses or glass-ceramics. The device is provided with a melting vat, at least two plaining containers serially connected after the outlet of the melting vat, and at least one of the plaining containers is built in accordance with the skull principle from a plurality of metal tubes comprising a cooling agent connection and a high-frequency device for inductively coupling high-frequency energy into the contents of the plaining container.

18 Claims, 2 Drawing Sheets

DEVICE AND METHOD OF PLAINING GLASSES OR GLASS-CERAMICS

BACKGROUND OF THE INVENTION

1. Field of the Invention

The invention is relative to a device and a method of plaining in the art of glass manufacturing, or glass ceramics.

2. Description of the Related Art

Melting vats of continuous glass-melting furnaces are operated for the continuous plaining of glass that have a melting range, a plaining range and a standing and homogenizing range. The actual degassing of the glass melt customarily takes place in the plaining zone. Redox reactions or evaporation effects take place here that result in the formation of bubbles and in the inflating of present bubbles. The temperature in the plaining zone is selected to be as high as possible in order that the bubbles can rise rapidly to the surface of the melt and that the melt becomes bubble-free. Classic vats are limited thereby to maximum admissible temperatures in a plaining range of 1650° C. on account of the wall material, that consist (as a rule) of fire-resistant ceramics or platinum or platinum alloys.

Numerous devices have become known with which glass can be melted or plained. See, e.g., EP 0,528,025 B1. It concerns a so-called skull crucible with a cooled crucible wall. The crucible wall is built up from a crown of vertical metal tubes that exhibit a mutual interval and through which a cooling medium flows. The crucible is surrounded by an induction coil through which high-frequency energy (HF) can be coupled into the crucible contents. In this manner the crucible contents can be brought to extremely high temperatures extending up to 3000° C.

The plaining process requires especially high temperatures. Test have shown that the rising rate or speed of the bubbles distinctly increases as the melting temperature increases. Thus, high-temperature plaining creates the possibility of either drastically lowering the plaining time or of eliminating the addition of plaining media for producing large plaining bubbles. Rather high plaining temperatures would be particularly desirable in the case of high-melting glasses. The invention has an object of further developing a device and a method in accordance with the initially described type in such a manner that the plaining process is intensified.

SUMMARY OF THE INVENTION

This problem is solved by the features of the independent claims. The inventor has recognized that the plaining process can be designed to be significantly more efficient if it is not carried out in a single container, but rather in at least two containers connected in series. The quality of the glass is distinctly improved again if the melt is not only heated in the first plaining container to very high temperatures and then cooled off, but rather reheated in a second container and then allowed to cool off.

There is also the possibility, by connecting two plaining zones in series, that by allowing the two plaining processes that are taking place there to develop under different conditions and of using different plaining means at different locations additional benefits may be created.

The plaining containers can be standing skull crucibles or grooves (e.g., channels). A standing skull crucible can also be combined with a groove. The groove can likewise be designed in the manner of a skull crucible. The crucible is built in any case, from a crown of metal tubes that are connected to a cooling medium. They are completely surrounded in any case by the windings of a HF coil.

If the cooled metal tubes of the groove run horizontally, the windings of the HF coil are to be placed in such a manner around the tubes that the crucible axis run horizontally. However, if the cooled metal tubes are arranged to be standing, the windings of the HF coil are placed around the tubes in such a manner that the central axis runs substantially vertically.

A device for plaining glasses and glass-ceramics comprising a melting vat, at least two plaining containers serially connected at the output end of said melting vat, and at least one of the plaining containers is built up according to the skull principle from a plurality of metal tubes comprising, for their part, a cooling-agent connection and from a high-frequency device for inductively coupling high-frequency energy into the contents of the plaining container.

A method for the plaining of glasses or glass-ceramics comprising the steps of:

Melting the substances; and then

Plaining in a plaining cascade consisting of two or more stages, in which the plaining takes place in at least one of these stages according to the skull principle with inductive heating of the melt by radiating high-frequency energy.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
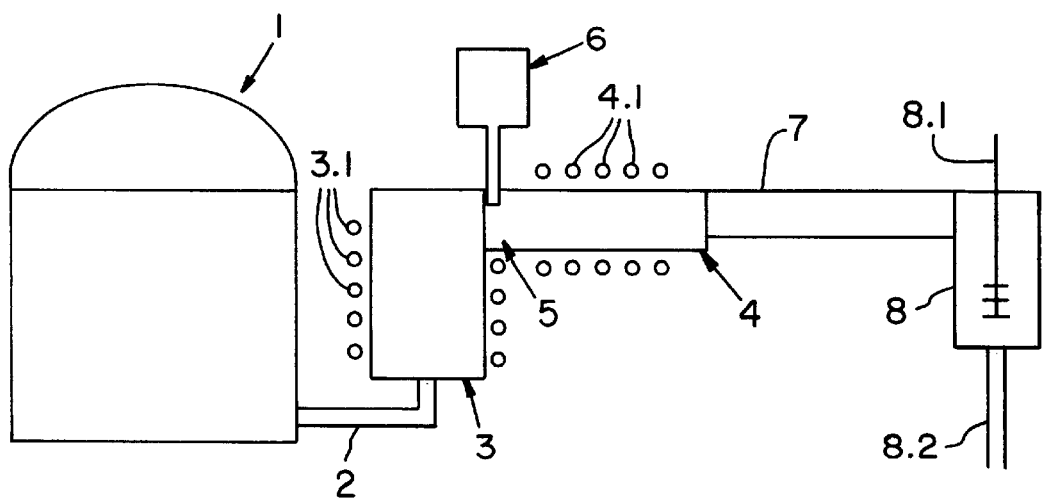
FIG. 1 shows a device with a melting vat, standing plaining crucible 1 and plaining groove 2.

In all four embodiments, melting vat 1 is a walled vat consisting of a ceramic material.

Connecting line 2 constitutes a conducting connection between melting vat 1 and plaining container 3 connected on the output side. As is apparent, connecting line 2 exits from melting vat 1 from its bottom area and enters into the bottom area of the first plaining container 3.

The first plaining container 3 is designed in the manner of a skull crucible. It is built up by a crown of vertical, liquid-cooled metal tubes that are not shown in detail here. The crown of metal tubes is surrounded by windings 3.1 of a high-frequency heating device.

The arrangement of connecting line 2 in the described manner results in the following advantage in the embodiment according to FIGS. 1 and 2:

The glass, ceramic, or glass-ceramic melt is relatively cold in the bottom area of melting vat 1. After its entrance into the bottom area of skull crucible 3 it is heated by HF device 3.1 and rises up. It is then so hot in the upper area that the gas bubbles burst on account of the low viscosity of the melt and can then exit.

In the embodiment according to FIG. 1, a second plaining container in the shape of a groove 4 is connected in on the output side of first plaining container 3. Thus, a lying or horizontal plaining container 4 follows standing plaining container 3. Groove 4 is again designed in the manner of a skull crucible. It accordingly comprises a crown of horizontally running metal tubes that can be circular in shape. This crown of metal tubes is again surrounded by windings 4.1 of a HF coil. Accordingly, the axis of winding of the coil windings also runs horizontally.

The manner of transferring the melt from skull crucible 3 to skull groove 4 is not shown here. The melt can either flow over in the area of the upper edge of skull groove 4, e.g., over a dam or it can also flow over in the area of the lower edge of skull groove 4, e.g., through a connecting line.

There is the possibility of introducing oxygen in the form of bubbles (so-called oxygen bubbling) between the two plaining containers 3,4 (see arrow 5). There is also the possibility of introducing active plaining media instead of the above or in addition thereto (see arrow 6).

Skull groove 4 is followed by cooling-off groove 7. Cooling-off groove 7 is followed by conditioning container 8 with agitator 8.1 and discharge 8.2. The process in the device of FIG. 1 is to be described in the following again in more detail. The first plaining container 3 is designated thereby as a glass pot, or crucible and the second plaining container 4 as a groove.

A combination of chemical plaining by an appropriately selected redox- or evaporation plaining medium with maximum release of gas in the temperature range of the glass pot, or crucible and of a physical plaining effect takes place in the glass pot, or crucible due to the low viscosity at high temperatures, the resulting high rise rate of the bubbles and the greater convection. A primarily physical plaining of the glass takes place in the groove at comparable plaining temperatures which physical plaining is particularly effective here on account of the combination of strong convection and low bath depth. When comparable plaining temperatures are used in the glass pot, or crucible and the groove, at the end of the first plaining step the bubbles are approximately 1000 times smaller then before the HF plaining. A further degassing takes place through the second plaining chamber, which degassing brings about a reduction of the bubble numbers by an approximate factor of only 10 to 100 on account of the consumption of the plaining medium by the first zone, but still contains as a positive effect the physical plaining that plays an important part at the high melting temperatures and low viscosities.

A further increase of the plaining effectiveness of this double arrangement can take place by the addition of two different plaining media of which the one plaining medium is activated in the glass pot, or crucible at temperature T (1) and the second plaining medium is activated in the groove at a temperature of T (2) where T (1) is lower than T (2). An example for this is the addition of stannous oxide and titanium oxide in an aluminosilicate glass. Stannous oxide has its optimal plaining temperature at approximately 1800 to 1900° C. In this temperature range there is still no release of gas from titanium oxide ($TiO_2$). Titanium oxide plains at 2000 to 2100° C. If the plaining temperature is adjusted in the first plaining part to 1850° C. and in the second part to 2100° C., both plaining units connected in series can be utilized in an optimum fashion as regards chemical and physical plaining.

In principle, plaining effects could occur in the case of glasses with low viscosity in melting vat 1 already if the melting crucible or parts of it are at a temperature level favorable for the plaining reaction so that melting vat 1 could already be considered as the first stage of the cascade plaining.

However, this arrangement is less favorable then the arrangement described here with two or more genuine plaining units separated spatially from the melting crucible due to the flow conditions, batch charges, solids mixture charges, and glass discharges the movement of the glass mass acts against the upward movement of the bubbles and draws rising bubbles repetitively down again and again. Moreover, in this instance the bubbles would have to penetrate the cold batch top surface, which is normally not successful, or the surface would have to be allowed to melt plain and clear in the meantime, which opposes a high throughput and is thus uneconomical. In the case of glasses with high viscosity a plaining can not be expected in any case since the bath depth is too great for a rise of bubbles in a glass with high viscosity and thus having a low rising rate.

A further improvement of the plaining in the double crucible system can take place by oxidizing the reduced plaining medium to a higher valency prior to the entrance of the melt into the second plaining phase. This can take place, for example, by bubbling in oxygen.

It is advantageous if the temperature of the glass melt is lowered during the oxidation to a higher valency to a lower temperature before it is raised again in the second plaining phase.

A further possibility for improvement is the supplying of active plaining medium into the melt prior to the start of the second plaining phase. In this instance there is the same reduction of bubbles in the second plaining phase as in the first plaining phase. That is, the number of bubbles is reduced twice by the same factor, which signifies, e.g., at a reduction by a factor of $10^3$ in one plaining part a total reduction of the bubble number of a factor of $10^6$.

Figure 2:
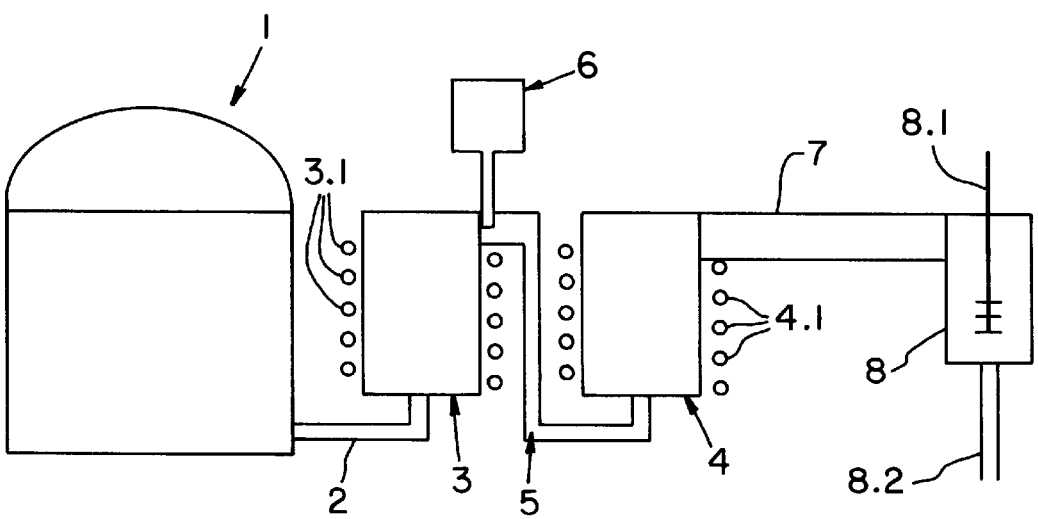
FIG. 2 shows a device with a melting vat and two standing plaining crucibles.

In the device according to FIG. 2, the second plaining container 4 is also a skull crucible. There are also the possibilities here of oxygen bubbling reference arrow 5, or of the addition of active plaining media reference arrow 6. A cooling-off groove 7 is also provided here, moreover, a conditioning device 8 with agitator 8.1 and discharge 8.2.

Figure 3:
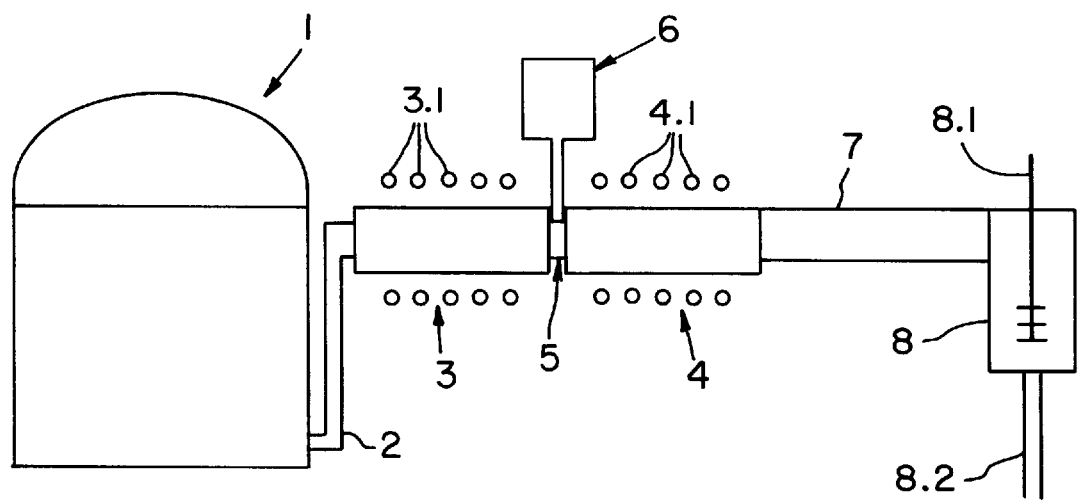
FIG. 3 shows a device with a melting vat and two plaining grooves.

FIG. 3 describes an interesting variant of the invention. In it melting vat 1 is followed by a first plaining groove 3 with skull design as well as by a second plaining groove 4, also in skull design. The other units are substantially the same as in the devices according to FIGS. 1 and 2.

The supplying of the active plaining medium can take place, as shown in FIGS. 1 to 3, by means of a crucible in which a suitable glass with a high content of active plaining medium is produced in situ and directly supplied. of course, the glass can also be poured first in rods or other suitable formats that can be suspended instead of the crucible at the same location in the melt and continuously supplied.

The requirements to be placed on the plaining glass are as follows:

The active plaining medium present in the plaining glass can be a redox plaining medium ($As_2O_5$, $Sb_2O_5$, $SnO_2$, $TiO_2$ and others) or an evaporation plaining medium (NaCl, $BaCl_2$, ZnO and others)

The plaining glass may only contain components that are also contained in the glass to be plained or do not cause problems in it. Due to the fact that the plaining glass is supplied to the glass to be plained in a dilution ratio of 1:20 to 1:100, minority components can be absolutely tolerated since they are then present in the finished product in a concentration that has no appreciable effects on the nature of the product.

The plaining glass must be miscible with the glass to be plained at the injection temperature.

The plaining glass must be meltable at low temperatures since high temperatures generally result in an undesired, premature consumption of the plaining medium. This can be brought about by, among other things, a high percentage of alkali oxides, boric oxide or fluorine; alkali oxides have the additional advantage of stabilizing the higher-valent oxidation states in the case of As and Sb and fluorine the additional advantage of evaporation plaining.

Examples of this type of glasses are cited in the following:
Example 1

| | |
|---|---|
| $B_2O_3$ | 6.6% |
| $Al_2O_3$ | 5.5% |
| CaO | 27% |
| BaO | 23.0% |
| $K_2O$ | 1% |
| $As_2O_3$ | 23.4% |
| $Fe_2O$ | 13.5% |

As can be replaced Sb if required; however, the concentrations of the other elements must then be readjusted, if necessary.

Example 2 (Several glasses from the same system are collated here that vary in the concentrations of the individual oxides. The indicated limits follow from the concrete class compositions and do not represent any basic limitation):
Example 2

| | |
|---|---|
| $SiO_2$ | 45–54% |
| $B_2O_3$ | 14–20% |
| $Al_2O_3$ | 1–3% |
| ZnO | 0–5% |
| $Na_2O$ | 0–3% |
| $K_2O$ | 5–13% |
| $Sb_2O_3$ | 19–22% |

Example 3

| | |
|---|---|
| $SiO_2$ | 1–3% |
| $B_2O_3$ | 0–3% |
| BaO | 36–38% |
| $La_2O_3$ | 0–2% |
| $ZrO_2$ | 4–8% |
| $TiO_2$ | 50–54% |

The cited glasses are to be understood as merely exemplary embodiments. A plurality of other glasses are also conceivable that can be used instead of the cited ones without making any basic changes to the method.

If the quality of the glass so requires, a series of any desired number of plaining crucibles is conceivable and the adjusting of as many good glass qualities as desired is possible in this manner. The optimizing factor here is the cost-effectiveness ratio since every further plaining stage not only produces an improvement of the quality but also additional expense. However, any required quality can be adjusted with the concept of cascade plaining.

In all instances described the walls of the plaining units are built up from liquid-cooled, metallic tubes or air-cooled, ceramic parts that are of such a nature that they are transparent for electromagnetic radiation in the frequency range of 10 kHz to 5 MHz.

The plaining zones are heated by radiating high-frequency energy into the melt. Suitable frequency ranges are in a range of 10 kHz to 5 MHz, according to the type of glass and the size of the aggregate unit. A frequency range of 100 kHz to 1 MHz proved to be a preferred range for the glasses tested at plaining volumes of 50 to 600 liters.

Figure 4:
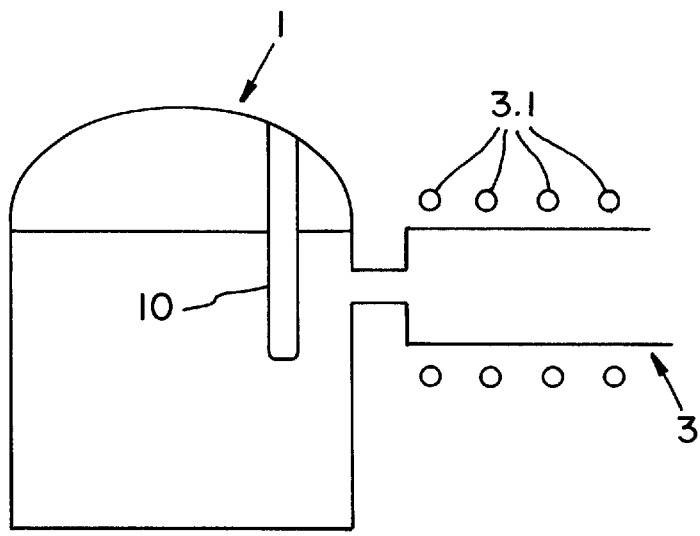
FIG. 4 shows a device with a melting vat and a plaining groove connected to it.

The embodiment of FIG. 4 shows melting vat 1 again. Plaining groove 3 is connected to the latter. The plaining groove is surrounded by windings 3.1 of a HF coil. The particular feature of this embodiment is that the batch mixture located in melting vat 1 is retained by bridge wall 10.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for plaining glasses and glass-ceramics comprising:
   a melting vat for a glass melt; and
   at least two plaining containers serially connected to the output end of said melting vat to thereby receive the glass melt, at least one of the plaining containers being built up according to the skull principle, said at least one of the plaining containers including a plurality of metal tubes comprising, for their part, a cooling-agent connection and further including a high-frequency device for inductively coupling high-frequency energy into the contents of the plaining container.

2. The device according to claim 1, in which at least one of said plaining containers is a standing skull crucible.

3. The device according to claim 1, further including a connecting line between the melting vat and the following plaining container, the first connecting line emptying into the bottom area of the following plaining container.

4. The device according to claim 1, further including a second connecting line between the two successive plaining containers, said second connecting line connected to the upper area of the upstream plaining container which empties into the bottom area of the next upstream plaining container.

5. The device according to claim 1, in which at least one of said plaining containers is designed as a horizontal channel.

6. The device according to claim 5, in which the windings of the high-frequency coil of at least one of the plaining containers designed as a skull channel having a horizontal winding axis.

7. A method for the plaining of glasses or glass-ceramics comprising the steps of:
   melting a plurality of substances together to thereby form a melt of glass; and then
   plaining in a plaining cascade consisting of two or more stages, the plaining taking place in at least one of these stages according to the skull principle with inductive heating of the melt, said inductive heating of the melt including radiating the melt with high-frequency energy.

8. The method according to claim 7, in which said plaining step takes place in the individual plaining units at temperatures in a range of 1600° C. to 2800° C.

9. The method according to claim 7, in which said plaining step takes place in skull crucibles through which the melt flows upward from below.

10. The method according to claim 7, in which said plaining step is carried out in a first stage according to the skull-principle with the melt flowing upward from below, the melt then flowing through a horizontal skull plaining channel heated with high-frequency energy in a second plaining stage.

11. The method according to claim 7, in which the melt is conducted through two series-connected plaining channels.

12. The method according to claim 7, further comprising the steps of:
   providing a redox plaining medium in the melt; and
   oxygen bubbling either during or between the individual plaining stages in order to oxidize the redox plaining medium to a higher valency and reactivate the melt for the following plaining stage.

13. The method according to claim 7, further comprising supplying an active plaining medium with plaining gas during or between the individual plaining stages.

14. The method according to claim 7, further comprising the steps of:
   supplying a first and second plaining material to the melt;
   said first and second plaining materials being different;
   activating said first plaining material;
   activating said second plaining material, whereby the release of plaining gas from the first plaining material takes place at lower temperatures than that of the second plaining material;
   the first plaining stage being operated in the temperature range of the maximum release of plaining gas from the first plaining material; and
   the second plaining stage being operated in the temperature range of the maximum release of plaining gas from the second plaining material.

15. The device according to claim 1, wherein each said plaining container is configured for promoting upward movement of gas bubbles within the glass melt.

16. The method according to claim 7, wherein said glass moves upwardly during at least one stage of plaining.

17. The method according to claim 7, wherein a first stage of plaining occurs at a different temperature than during a second subsequent stage of plaining.

18. The method according to claim 17, wherein the first stage of plaining occurs at a lower temperature than during the second subsequent stage of plaining.

* * * * *